(12) United States Patent
Sawada et al.

(10) Patent No.: US 12,128,769 B2
(45) Date of Patent: Oct. 29, 2024

(54) ELECTRIC VEHICLE CONTROL METHOD AND ELECTRIC VEHICLE CONTROL DEVICE

(71) Applicant: NISSAN MOTOR CO., LTD., Yokohama (JP)

(72) Inventors: Akira Sawada, Kanagawa (JP); Takashi Nakajima, Kanagawa (JP); Kengo Fujiwara, Kanagawa (JP); Jun Motosugi, Kanagawa (JP); Katsunori Nakamura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/687,227

(22) PCT Filed: Aug. 30, 2021

(86) PCT No.: PCT/JP2021/031783
§ 371 (c)(1),
(2) Date: Feb. 27, 2024

(87) PCT Pub. No.: WO2023/032012
PCT Pub. Date: Mar. 9, 2023

(65) Prior Publication Data
US 2024/0270086 A1 Aug. 15, 2024

(51) Int. Cl.
*B60L 15/20* (2006.01)
*H02P 21/05* (2006.01)
(Continued)

(52) U.S. Cl.
CPC ............ *B60L 15/20* (2013.01); *H02P 21/05* (2013.01); *H02P 21/20* (2016.02); *H02P 21/22* (2016.02); *B60L 2240/423* (2013.01)

(58) Field of Classification Search
CPC ...................................................... B60L 15/20
See application file for complete search history.

(56) References Cited

U.S. PATENT DOCUMENTS

| | | | |
|---|---|---|---|
| 8,935,030 B2 * | 1/2015 | Oikawa | B60K 6/445 340/432 |
| 2002/0190683 A1 | 12/2002 | Karikomi et al. | |

(Continued)

FOREIGN PATENT DOCUMENTS

| | | | |
|---|---|---|---|
| CN | 104870867 A * | 8/2015 | ............ F16H 61/14 |
| CN | 104890720 A | 9/2015 | |

(Continued)

*Primary Examiner* — Shelley Chen
(74) *Attorney, Agent, or Firm* — Foley & Lardner LLP

(57) ABSTRACT

A control method for an electric vehicle equipped with an electric motor as a driving source, the method including: setting a torque target value as a target value related to a driving torque of the electric vehicle based on vehicle information; calculating a basic feedback compensation value based on a parameter indicating a rotation state of the electric motor and a vehicle model of the electric vehicle; calculating a first feedback compensation value by multiplying the basic feedback compensation value by a first gain; calculating a second feedback compensation value by extracting a predetermined specific frequency component from the basic feedback compensation value and multiplying the specific frequency component by a second gain; calculating a torque command value by correcting the torque target value by the first feedback compensation value and the second feedback compensation value; and driving the electric motor based on the torque command value.

9 Claims, 7 Drawing Sheets

(51) Int. Cl.
*H02P 21/20* (2016.01)
*H02P 21/22* (2016.01)

(56) References Cited

U.S. PATENT DOCUMENTS

| | | |
|---|---|---|
| 2005/0274560 A1 | 12/2005 | Wakao et al. |
| 2012/0185121 A1 | 7/2012 | Umehara et al. |
| 2013/0231838 A1 | 9/2013 | Shiozawa et al. |
| 2014/0046526 A1* | 2/2014 | Oikawa ................ B60W 10/08 |
| | | 701/99 |
| 2015/0251691 A1 | 9/2015 | Tamaizumi et al. |
| 2015/0330505 A1* | 11/2015 | Kusabe ................ F16H 61/143 |
| | | 701/68 |
| 2018/0056811 A1 | 3/2018 | Iwahana |
| 2022/0314992 A1 | 10/2022 | Tani |

FOREIGN PATENT DOCUMENTS

| | | | | |
|---|---|---|---|---|
| EP | 2 610 605 A1 | | 7/2013 | |
| EP | 2899878 B1 | * | 3/2018 | ............. H02P 23/00 |
| EP | 3 388 281 B1 | | 10/2018 | |
| JP | 2002-127881 A | | 5/2002 | |
| JP | 2003-009566 A | | 1/2003 | |
| JP | 2004343948 A | * | 12/2004 | |
| JP | 2010270822 A | * | 12/2010 | |
| JP | 2017-225278 A | | 12/2017 | |
| JP | 2018033216 A | * | 3/2018 | |
| JP | 2019-180231 A | | 10/2019 | |
| JP | 2021-103350 A | | 7/2021 | |
| JP | 7486933 B2 | * | 5/2024 | |
| RU | 2657624 C1 | * | 6/2018 | .......... B60L 15/2054 |

* cited by examiner

ELECTRIC VEHICLE CONTROL METHOD AND ELECTRIC VEHICLE CONTROL DEVICE

TECHNICAL FIELD

The present invention relates to a control method and a control device for an electric vehicle equipped with an electric motor as a driving source.

BACKGROUND ART

JP2003-009566A discloses vibration damping control for an electric vehicle using a feedforward compensator and a feedback compensator. The feedforward compensator in this document is configured to function as a vibration damping filter that has a characteristic of reducing frequency components equivalent to torsional vibration of a wheel drive system. The feedback compensator is configured to perform vibration damping control based on a deviation between an estimated value and an actual value of a motor rotation speed.

SUMMARY OF INVENTION

As described above, vibration damping control in the related art is a type of control that reduces vehicle vibration mainly caused by torsional vibration of the wheel drive system from a motor to wheels. However, in a traveling scene where a traveling load is large, such as a traveling scene where a traveling resistance is large on sandy ground or the like, vibration in an up-down direction may occur in a vehicle body. That is, during high-load traveling, vibration may occur in the vehicle body due to factors other than the torsional vibration of the wheel drive system, and the vibration damping control in the related art may not provide a sufficient vibration damping effect.

An object of the present invention is to provide a control method and a control device for an electric vehicle that can suppress vibration of a vehicle body caused by torsional vibration of a wheel drive system as well as vibration of the vehicle body caused by factors other than the torsional vibration of the wheel drive system.

One aspect of the present invention is a control method for an electric vehicle equipped with an electric motor as a driving source, the method including: setting a torque target value as a target value related to a driving torque of the electric vehicle based on vehicle information; calculating a basic feedback compensation value based on a parameter indicating a rotation state of the electric motor and a vehicle model of the electric vehicle; calculating a first feedback compensation value by multiplying the basic feedback compensation value by a first gain; calculating a second feedback compensation value by extracting a predetermined specific frequency component from the basic feedback compensation value and multiplying the specific frequency component by a second gain; calculating a torque command value by correcting the torque target value by the first feedback compensation value and the second feedback compensation value; and driving the electric motor based on the torque command value.

DESCRIPTION OF EMBODIMENTS

Hereinafter, an embodiment of the present invention will be described with reference to the drawings.

Figure 1:
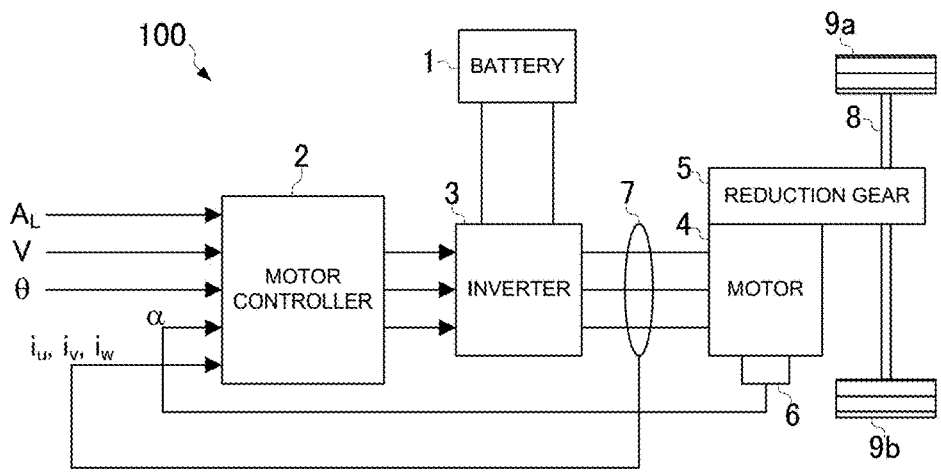
FIG. 1 is a block diagram showing a main configuration of an electric vehicle.

FIG. 1 is a block diagram showing a main configuration of an electric vehicle 100. As shown in FIG. 1, the electric vehicle 100 includes a battery 1, a motor controller 2, an inverter 3, an electric motor 4, a reduction gear 5, a rotation sensor 6, a current sensor 7, a drive shaft 8, a drive wheel 9a, a drive wheel 9b, and the like. Note that an electric vehicle refers to a vehicle that uses an electric motor as a driving source or a braking source. A vehicle that can use an electric motor as a part or all of a driving source or a braking source of the vehicle is an electric vehicle. That is, electric vehicles include not only electric vehicles but also hybrid vehicles, fuel cell vehicles, and the like. The electric vehicle 100 of the present embodiment is an electric vehicle that uses the electric motor 4 as a driving source.

The battery 1 is connected to the electric motor 4 via the inverter 3, and supplies driving power to the electric motor 4 by discharging. The battery 1 also can be charged by receiving regenerative power from the electric motor 4.

The motor controller 2 is, for example, a computer including a central processing unit (CPU), a read-only memory (ROM), a random access memory (RAM), an input/output interface (I/O interface), and the like. The motor controller 2 generates a control signal for directly or indirectly controlling the electric motor 4 based on vehicle information of the electric vehicle 100. The motor controller 2 is programmed to generate a control signal for the electric motor 4 at a predetermined control period.

The vehicle information is information indicating an operating state or a control state of the entire electric vehicle 100 or each unit constituting the electric vehicle 100, and is a so-called vehicle variable. The vehicle information can be obtained by detection, measurement, generation, calculation, estimation, or the like. For example, an acceleration (hereinafter referred to as a longitudinal acceleration) $A_L$ [m/s$^{-2}$] in a front-rear direction of the electric vehicle 100, a vehicle speed V [km/h], an accelerator opening θ [%], a rotor phase α [rad] of the electric motor 4, currents $i_u$, $i_v$, $i_w$ [A] of the electric motor 4, a DC voltage value $V_{dc}$ [V] of the battery 1 (not shown) and the like are included in the vehicle information of the electric vehicle 100. The motor controller 2 controls the electric motor 4 using these kinds of vehicle information input as digital signals for example.

The control signal for controlling the electric motor 4 is, for example, a pulse width modulation (PWM) signal that controls the current of the electric motor 4. The motor controller 2 generates a driving signal for the inverter 3 according to the PWM signal. The driving signal for the inverter 3 is also a control signal for controlling the electric motor 4.

The inverter 3 includes, for example, two switching elements (for example, power semiconductor elements such as insulated gate bipolar transistors (IGBTs) or metal-oxide-semiconductor field-effect transistors (MOS-FETs)) corresponding to each phase. The inverter 3 turns on/off the switching element in response to the driving signal generated by the motor controller 2, thereby converting a direct current supplied from the battery 1 into an alternating current and adjusting the current supplied to the electric motor 4. The inverter 3 reversely converts the alternating current generated by the electric motor 4 due to a regenerative braking force into a direct current, and adjusts the current supplied to the battery 1.

The electric motor 4 is, for example, a three-phase AC motor, and generates a driving force using the alternating current supplied from the inverter 3. The driving force generated by the electric motor 4 is transmitted via the reduction gear 5 and the drive shaft 8 to the pair of left and right drive wheels 9a and 9b. When the electric motor 4 rotates while being rotated by the drive wheels 9a and 9b, the electric motor 4 generates a regenerative braking force and recovers kinetic energy of the electric vehicle 100 as electric energy.

The reduction gear 5 includes, for example, a plurality of gears. The reduction gear 5 reduces a rotation speed of the electric motor 4 and transmits the reduced rotation speed to the drive shaft 8, thereby generating a driving torque or a braking torque (hereinafter, simply referred to as a torque) proportional to a speed reduction ratio.

The rotation sensor 6 detects the rotor phase α of the electric motor 4 and outputs the detected rotor phase a to the motor controller 2. The rotation sensor 6 is, for example, a resolver or an encoder.

The current sensor 7 detects a current flowing through the electric motor 4 and outputs the detected current to the motor controller 2. In the present embodiment, the current sensor 7 detects the alternating currents $i_u$, $i_v$, $i_w$ of three phases of the electric motor 4. Note that the currents of any two phases may be detected using the current sensor 7, and the current of the remaining one phase may be calculated.

Note that the longitudinal acceleration $A_L$, which is one kind of the vehicle information, can be detected at any timing by using an acceleration sensor or other controllers (not shown). The accelerator opening θ can be detected using an accelerator opening sensor or other controllers (not shown). The same applies to other kinds of vehicle information such as the vehicle speed V and the DC voltage value Vac of the battery 1, and these various kinds of vehicle information can be detected at any timing using a sensor or other controllers (not shown).

Figure 2:
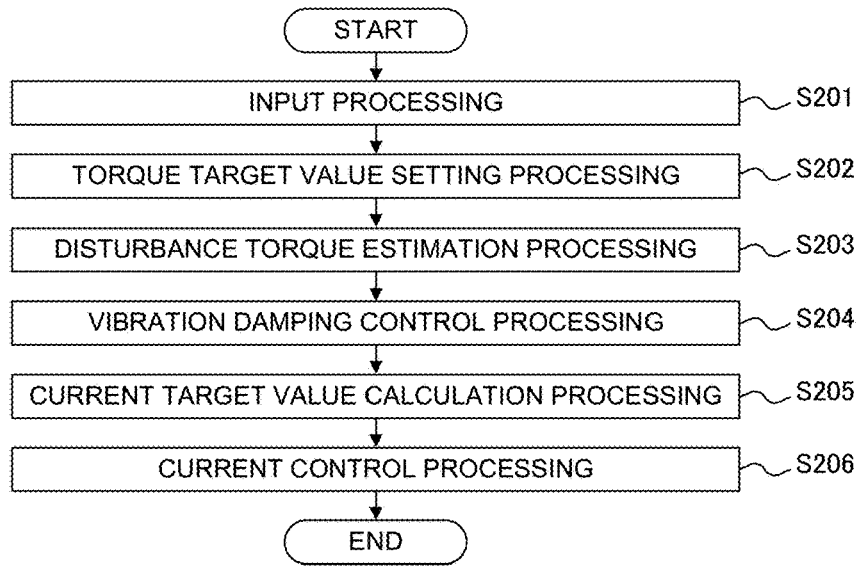
FIG. 2 is a flowchart showing a control mode for the electric vehicle.

FIG. 2 is a flowchart showing a control mode for the electric vehicle 100. As shown in FIG. 2, the motor controller 2 performs input processing, torque target value setting processing, disturbance torque estimation processing, vibration damping control processing, current target value calculation processing, and current control processing in this order at a predetermined control period.

The input processing in a step S201 is processing in which the motor controller 2 receives input of the vehicle information, calculates various parameters to be used in processing after a step S202 as necessary, and the like.

In the present embodiment, the motor controller 2 acquires the longitudinal acceleration $A_L$, the accelerator opening θ, the rotor phase α, the currents $i_u$, $i_v$, $i_w$ of the electric motor 4, and the DC voltage value $V_{dc}$ of the battery 1 from various sensors. The motor controller 2 uses some or all of the directly acquired vehicle information to calculate a motor electric angular velocity $\omega_e$ [rad/s], which is an electric angular velocity of the electric motor 4, a rotation speed $\omega_m$ [rad/s], which is a mechanical angular velocity of the electric motor 4, a rotation speed $N_m$ [rpm] of the electric motor 4 after unit conversion, and the angular velocity $\omega_w$ [rad/s] of the drive wheels 9a, 9b, the vehicle speed V, and the like.

Specifically, the motor controller 2 calculates the motor electric angular velocity $\omega_e$ by time-differentiating the rotor phase α. Then, the motor controller 2 calculates the rotation speed $\omega_m$ by dividing the motor electric angular velocity $\omega_e$ by the number of pole pairs of the electric motor 4. Furthermore, the motor controller 2 calculates the rotation speed $N_m$ by multiplying the rotation speed $\omega_m$ by a unit conversion coefficient (60/2π).

The motor controller 2 calculates the angular velocity $\omega_w$ of the drive wheels 9a, 9b by dividing the rotation speed $\omega_m$ or the rotation speed $N_m$ by a gear ratio of a final gear of the reduction gear 5. The motor controller 2 calculates the vehicle speed V by multiplying the angular velocity $\omega_w$ by a load radius r [m] of the drive wheels 9a, 9b, and then by a unit conversion coefficient (3600/1000).

Note that instead of being calculated as described above, the vehicle speed V may be directly acquired by communicating with another controller such as a meter or a brake controller. When the plurality of drive wheels 9a and 9b are each provided with a wheel speed sensor, an average value of wheel speed sensor values can be used as the vehicle speed V. In addition, for the vehicle speed V, a value obtained from a sensor such as the Global Positioning System (GPS) may be used, a value selected from the wheel speed sensor or the like may be used, or a vehicle speed estimated value calculated using a longitudinal acceleration sensor or the like may be used (see JP2002-127881A and the like).

Figure 3:
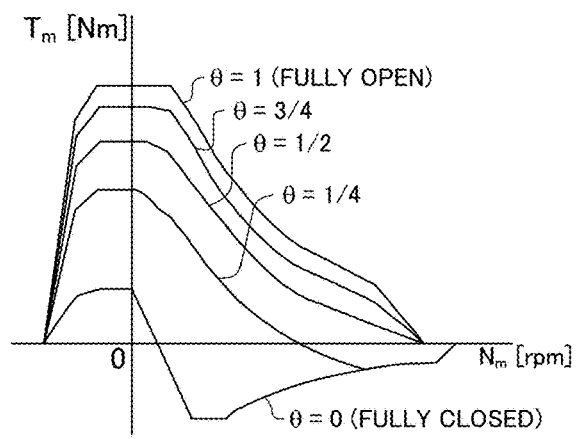
FIG. 3 is an example of an accelerator opening-torque table.

The torque target value setting processing in the step S202 is processing of setting a driving torque target value $T_m$, which is a target value related to the driving torque of the electric vehicle 100. The motor controller 2 sets the driving torque target value $T_m$ based on the accelerator opening θ and the rotation speed $N_m$ by referring to an accelerator opening-torque table shown in FIG. 3, for example. That is, the motor controller 2 functions as a driving torque target value setting unit or a torque target value setting unit.

The disturbance torque estimation processing in a step S203 is processing of calculating a disturbance torque estimated value $T_d\hat{}$, which is an estimated value of a torque generated due to a disturbance acting on the electric vehicle 100 (hereinafter referred to as disturbance torque). The disturbance acting on the electric vehicle 100 is an external factor that increases or decreases a traveling resistance of the electric vehicle 100. Specifically, the disturbances that act on the electric vehicle 100 include air resistance, modeling errors due to variations in vehicle weight depending on the number of passengers and loading capacity, rolling resistance of the drive wheels 9a and 9b, gradient resistance of road surface, sinking of the drive wheels 9a, 9b into the road surface, and the like. The motor controller 2 calculates the disturbance torque estimated value $T_d\hat{}$ using the rotation speed $\omega_m$ and a previous value of a final torque command value $T_{mf}$ calculated in a step S204. Details of the disturbance torque estimation processing will be described later.

Vibration damping control processing in a step S204 is processing of calculating the final torque command value $T_{mf}$ for suppressing vibration of a wheel drive system. The motor controller 2 uses the driving torque target value $T_m$ and the rotation speed $\omega_m$ to calculate the final torque command value $T_{mf}$ without sacrificing torque response of the drive shaft 8. The vibration in the wheel drive system is typically rotational vibration in the front-rear direction of the electric vehicle 100 (hereinafter referred to as longitudinal vibration) caused by torsional vibration of the drive shaft 8 and the like. In addition, the vibration in the wheel drive system may include vibration in an up-down direction of the electric vehicle 100 (hereinafter referred to as vertical vibration) due to sinking of the drive wheels 9a, 9b into the road surface and the like. Drive control of the electric vehicle 100 according to the final torque command value $T_{mf}$ of the present embodiment suppresses both the longitudinal vibration and the vertical vibration of the electric vehicle 100. Details of the vibration damping control processing will be described later.

The current target value calculation processing in a step S205 is processing of calculating a d-axis current target value $i_d^*$, which is a target value of a d-axis current $i_d$ of the electric motor 4, and a q-axis current target value $i_q^*$, which is a target value of a q-axis current $i_q$ (both not shown). The motor controller 2 stores in advance a dq-axis current target value table (not shown) that associates the final torque command value $T_{mf}$, rotation speed $\omega_m$, and DC voltage value $V_{dc}$ with the d-axis current target value $i_d^*$ and the q-axis current target value $i_q^*$. Therefore, the motor controller 2 calculates the d-axis current target value $i_d^*$ and the q-axis current target value $i_q^*$ corresponding to the final torque command value $T_{mf}$, the rotation speed $\omega_m$, and the DC voltage value $V_{dc}$ by referring to this dq-axis current target value table.

The current control processing in a step S206 is processing of generating a torque for driving or braking the electric vehicle 100 by controlling the current of the electric motor 4. In the current control processing, the motor controller 2 first calculates the d-axis current is and the q-axis current $i_q$ based on the currents $i_u$, $i_v$, $i_w$ of the electric motor 4 and the rotor phase α. Next, the motor controller 2 calculates a d-axis voltage command value $v_d$ and the q-axis voltage command value $v_q$ based on deviations between the d-axis current target value $i_d^*$, the q-axis current target value $i_q^*$ and the d-axis current $i_d$, the q-axis current $i_q$. Furthermore, the motor controller 2 calculates voltage command values $v_u$, $v_v$, $v_w$ of three phases based on the d-axis voltage command value $v_d$, the q-axis voltage command value $v_q$, and the rotor phase α. Then, the motor controller 2 calculates duty ratios $t_u$, $t_v$, $t_w$ [%] of PWM signals input to each phase based on the voltage command values $v_u$, $v_v$, $v_w$ of three phases and the DC voltage value $V_{dc}$.

The motor controller 2 controls the electric motor 4 by turning on or off the switching elements of the inverter 3 according to the PWM signal obtained in this way. As a result, the motor controller 2 drives or brakes the electric vehicle 100 with a desired torque specified by the final torque command value $T_{mf}$. That is, the motor controller 2 and/or the inverter 3 functions as a drive control unit that drives the electric motor 4 based on the final torque command value $T_{mf}$.

<Disturbance Torque Estimation Processing>

The motor controller 2 uses a transfer characteristic Gp(s) from the driving torque target value $T_m$ to the rotation speed $\omega_m$ in the disturbance torque estimation processing. The transfer characteristic Gp(s) is a vehicle model of the electric vehicle 100 in which torsional vibration of the wheel drive system is taken into consideration. The transfer characteristic Gp(s) is calculated using an equation of motion derived from a dynamic model of the electric vehicle 100 shown in FIG. 4. Each symbol in the dynamic model and/or the equation of motion of the electric vehicle 100 in FIG. 4 is as follows.

Figure 4:
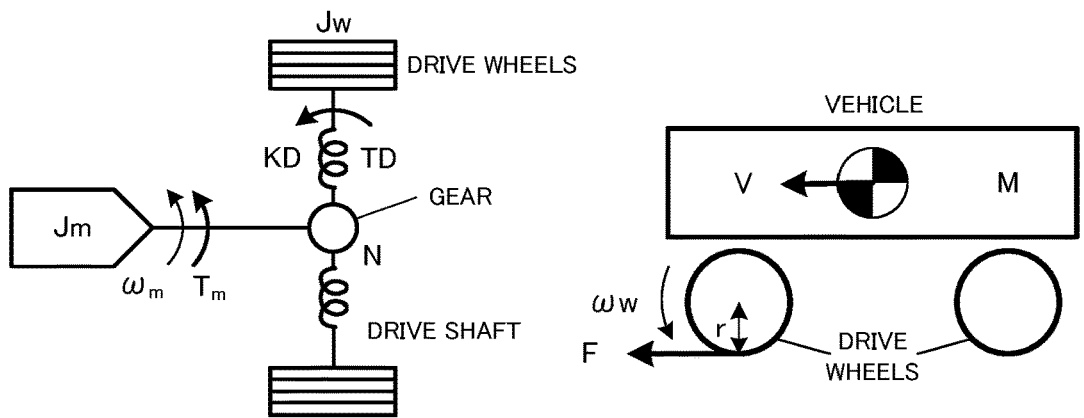
FIG. 4 is an explanatory diagram showing a dynamic model of the electric vehicle.

$J_m$: electric motor inertia
$J_w$: drive wheel inertia
M: vehicle mass
KD: torsional rigidity of wheel drive system
$K_t$: coefficient related to friction between drive wheel and road surface
N: overall gear ratio
r: load radius of drive wheel
$\omega_m$: rotation speed of motor
$T_m$: driving torque target value
TD: drive wheel torque
F: force applied to vehicle
V: speed of vehicle (vehicle speed)
$\omega_w$: angular velocity of drive wheel From the dynamic model of the electric vehicle 100 shown in FIG. 4, the following equations of motion (1) to (5) can be derived. Note that the symbol "*" in the equations (1) to (3) represents time differentiation.

[Formula 1]

$$J_m \cdot \omega m^* = T_m - TD/N \tag{1}$$

$$2J_w \cdot \omega_w^* = TD - r \cdot F \tag{2}$$

$$M \cdot V^* = F \tag{3}$$

$$TD = KD \int (\omega_m/N - \omega_w) dt \tag{4}$$

$$F = K_t(r \cdot \omega_w - V) \tag{5}$$

When the transfer characteristic Gp(s) is determined based on the above equations of motion (1) to (5), it can be expressed by an equation (6). The coefficients $a_1$ to $a_4$ and the coefficients $b_0$ to $b_3$ in the equation (6) are expressed by equations (7) to (14).

[Formula 2]

$$Gp(s) = \frac{b_3 s^3 + b_2 s^2 + b_1 s + b_0}{s(a_4 s^3 + a_3 s^2 + a_2 s + a_1)} \tag{6}$$

$$a_4 = 2J_m \cdot J_w \cdot M \qquad (7)$$

$$a_3 = J_m(2J_w + M \cdot r^2)K_t \qquad (8)$$

$$a_2 = (J_m + 2J_w/N^2)M \cdot KD \qquad (9)$$

$$a_1 = (J_m + 2J_w/N^2 + M \cdot r^2/N^2)KD \cdot K_t \qquad (10)$$

$$b_3 = 2J_w \cdot M \qquad (11)$$

$$b_2 = (2J_w + M \cdot r^2)K_t \qquad (12)$$

$$b_1 = M \cdot KD \qquad (13)$$

$$b_0 = KD \cdot K_t \qquad (14)$$

When examining poles and zeros of the transfer characteristic Gp(s) shown in the above equation (6), one pole and one zero show extremely close values. This means that α and β in an equation (15) below have extremely close values.

[Formula 3]

$$Gp(s) = \frac{(s + \beta)(b'_2 s^2 + b'_1 s + b'_0)}{s(s + \alpha)(a'_3 s^2 + a'_2 s + a'_1)} \qquad (15)$$

Therefore, by performing pole-zero cancellation that approximates α=β in the equation (15), the transfer characteristic Gp(s) in the (quadratic)/(cubic) form can be obtained as shown in an equation (16) below.

[Formula 4]

$$Gp(s) = \frac{(b'_2 s^2 + b'_1 s + b'_0)}{s(a'_3 s^2 + a'_2 s + a'_1)} \qquad (16)$$

An inherent vibration angular velocity op can be expressed by the following equation (17) using a coefficient $a_1'$ and a coefficient $a_3'$ used in a denominator of the equation (16). Furthermore, the inherent vibration angular velocity $\omega_p$ can be converted into a resonance frequency (inherent vibration frequency) $f_p$ using the following equation (18).

[Formula 5]

$$\omega_p = (\alpha_1'/\alpha_3')^{1/2} \qquad (17)$$

$$f_p = \omega_p/2\pi \qquad (18)$$

In the present embodiment, the motor controller 2 uses the transfer characteristic Gp(s) of the equation (16) in the disturbance torque estimation processing, but instead of the transfer characteristic Gp(s) of the equation (16), the motor controller 2 may use a transfer characteristic Gp(s) expressed by the following equation (19). An equivalent mass $M_v$ used in the transfer characteristic Gp(s) of the equation (19) is determined from the mass M of the vehicle, the inertia $J_m$ of the electric motor 4, and the inertia $J_w$ of the drive wheels 9a and 9b, as shown in an equation (20). The coefficient $K_M$ used in the transfer characteristic Gp(s) of the equation (19) is expressed by an equation (21).

[Formula 6]

$$Gp(s) = \frac{K_M}{M_v \cdot s} \qquad (19)$$

$$M_v = M + \frac{2J_w}{r^2} + \frac{2J_m \cdot N^2}{r^2} \qquad (20)$$

$$K_M = \frac{N^2}{r^2} \qquad (21)$$

Figure 5:
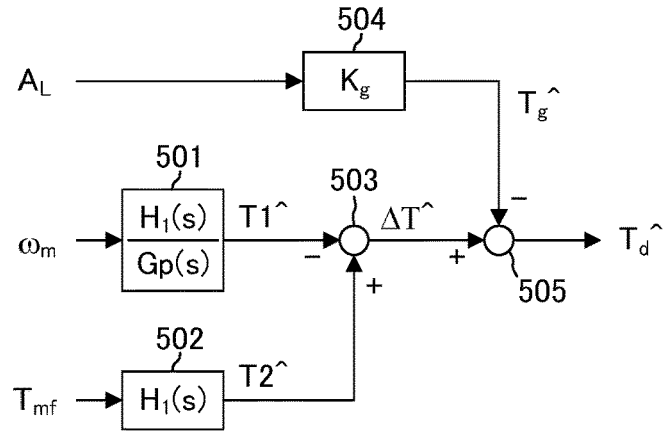
FIG. 5 is a block diagram of disturbance torque estimation processing.

FIG. 5 is a block diagram of the disturbance torque estimation processing. As shown in FIG. 5, in order to execute the disturbance torque estimation processing, the motor controller 2 functions as a first motor torque estimation unit 501, a second motor torque estimation unit 502, a subtraction unit 503, a gradient resistance estimation unit 504, and a subtraction unit 505.

The first motor torque estimation unit 501 calculates a first motor torque estimated value T1^. The first motor torque estimated value T1^ is a motor torque estimated based on the rotation speed $\omega_m$. In the present embodiment, the first motor torque estimation unit 501 calculates the first motor torque estimated value T1^ by filtering the rotation speed $\omega_m$. More specifically, the first motor torque estimation unit 501 is configured with a filter having a characteristic expressed by $H_1(s)/Gp(s)$ using a low-pass filter $H_1(s)$ and an inverse characteristic 1/Gp(s) of the transfer characteristic Gp(s). The low-pass filter $H_1(s)$ is expressed by the following equation (22) using a time constant $\sigma_v$.

[Formula 7]

$$H_1(s) = \frac{1}{\tau_v s + 1} \qquad (22)$$

The second motor torque estimation unit 502 calculates a second motor torque estimated value T2^. The second motor torque estimated value T2^ is a motor torque estimated based on the final torque command value $T_{mf}$. In the present embodiment, the first motor torque estimation unit 501 calculates the second motor torque estimated value T2^ by filtering the final torque command value $T_{mf}$. More specifically, the second motor torque estimation unit 502 is configured with the low-pass filter $H_1(s)$.

The subtraction unit 503 calculates a deviation between the first motor torque estimated value T1^ and the second motor torque estimated value T2^ (hereinafter referred to as torque estimated deviation ΔT^). In the present embodiment, the subtraction unit 503 calculates the torque estimated deviation ΔT^ by subtracting the first motor torque estimated value T1^ from the second motor torque estimated value T2^.

The gradient resistance estimation unit 504 calculates a gradient resistance estimated value $T_g$^ based on the longitudinal acceleration $A_L$. The gradient resistance is a traveling resistance caused by a gradient of the road surface, and the gradient resistance estimated value $T_g$^ is an estimated value thereof. In the present embodiment, the gradient resistance estimation unit 504 calculates the gradient resistance estimated value $T_g$^ by multiplying the longitudinal acceleration $A_L$ by a coefficient $K_g$.

Figure 6:
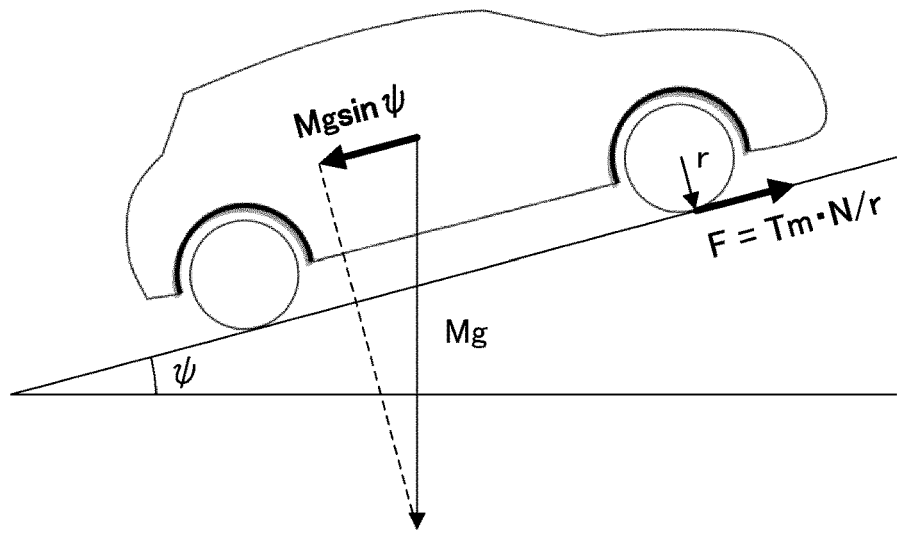
FIG. 6 is an explanatory diagram of gradient resistance estimation processing performed by a gradient resistance estimation unit.

FIG. 6 is an explanatory diagram of the gradient resistance estimation processing performed by the gradient resistance estimation unit 504. A force F applied to the electric vehicle 100, a gravity Mg acting on the electric vehicle 100, and a gradient ψ of the road surface have a correlation shown in FIG. 6. Therefore, for the gradient ψ, a coefficient $K_g$ is expressed by the following equation (23). By multiplying the longitudinal acceleration $A_L$ by this coefficient $K_g$, the gradient resistance estimated value $T_g\hat{}$ for the electric vehicle 100 to balance on the road surface with the gradient $\psi$ is calculated.

[Formula 8]

$$K_g = \frac{rMg}{N} \quad (23)$$

The subtraction unit 505 calculates the disturbance torque estimated value $Ta\hat{}$ by subtracting the gradient resistance estimated value $T_g\hat{}$ from the torque estimated deviation $\Delta T\hat{}$.

As mentioned above, the disturbance torque estimated value $T_d\hat{}$ is calculated by subtracting the gradient resistance estimated value $T_g\hat{}$ from the torque estimated deviation $\Delta T\hat{}$, which comprehensively includes all disturbance torques caused by disturbance. Therefore, the disturbance torque estimated value $T_d\hat{}$ has influence of the gradient resistance reduced or eliminated.

Furthermore, among a plurality of disturbance factors, the gradient resistance and the sinking of the drive wheels 9a, 9b into the road surface are factors that cause particularly large fluctuations in the traveling resistance. However, as described above, the disturbance torque estimated value $T_d\hat{}$ has contribution of the gradient resistance reduced or eliminated. Therefore, when traveling on a road surface where the drive wheels 9a, 9b sink into the road surface, such as a sandy ground road surface, a deep snowy road surface, or a muddy road surface (hereinafter referred to as a soft road surface), the disturbance torque estimated value $T_d\hat{}$ accurately represents an increase in the traveling resistance due to the soft road surface. On the other hand, when traveling on a normal road surface where the drive wheels 9a and 9b do not sink into the road surface (hereinafter referred to as a hard road surface), no large fluctuation occurs in the disturbance torque estimated value $T_d\hat{}$. That is, the disturbance torque estimated value $T_d\hat{}$ represents the fluctuation in the traveling resistance on the road surface.

<Vibration Damping Control Processing>

Figure 7:
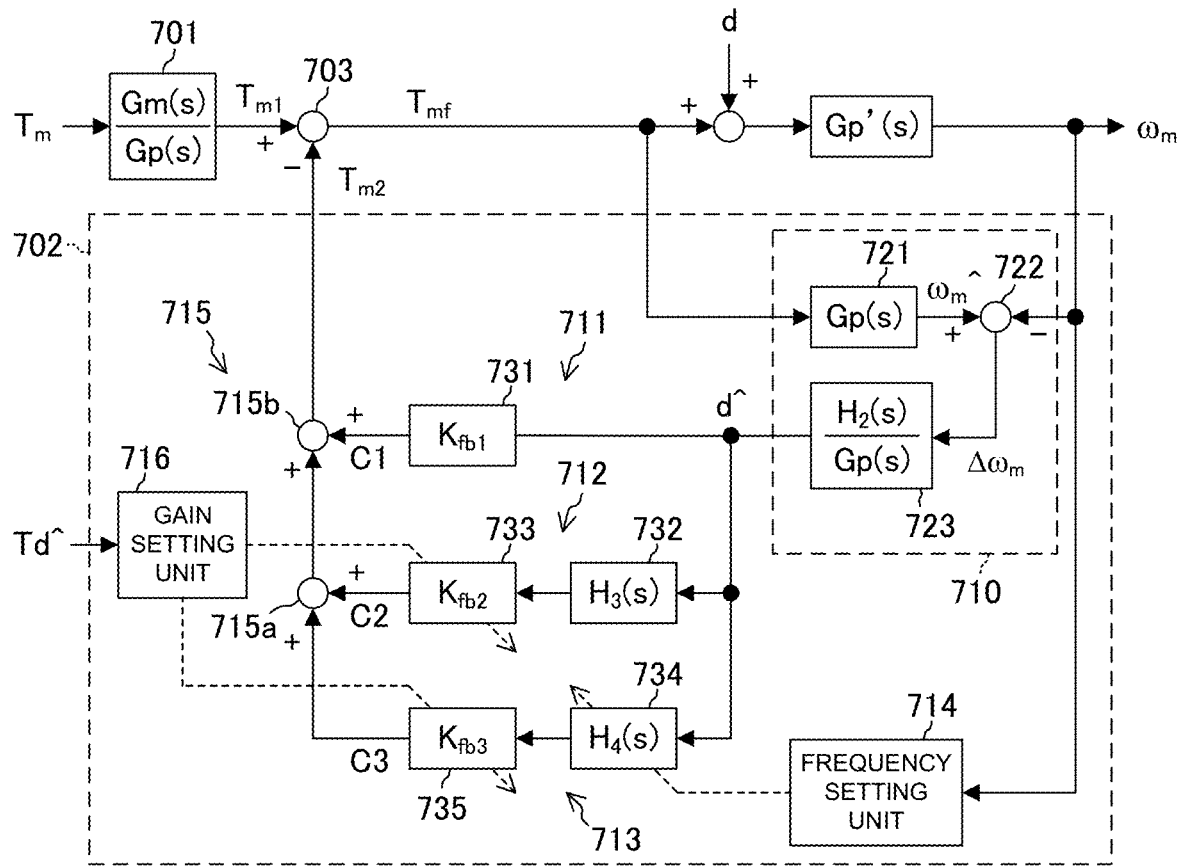
FIG. 7 is a block diagram of vibration damping control processing.

FIG. 7 is a block diagram of the vibration damping control processing. As shown in FIG. 7, the motor controller 2 functions as a feedforward compensator 701, a feedback compensator 702, and a final torque command value calculation unit 703 for the vibration damping control processing.

The feedforward compensator 701 calculates a first torque target value $T_{m1}$ based on the driving torque target value $T_m$. In the present embodiment, the feedforward compensator 701 is a vibration damping filter, and calculates the first torque target value $T_{m1}$ by filtering the driving torque target value $T_m$. The feedforward compensator 701 is configured by, for example, an ideal transfer characteristic Gm(s) and the inverse characteristic 1/Gp(s) of the transfer characteristic Gp(s), and has a transfer characteristic of Gm(s)/Gp(s). This feedforward compensator 701 functions as a vibration damping filter that suppresses the torsional vibration of the wheel drive system. Note that the ideal transfer characteristic Gm(s) is an ideal transfer characteristic from the driving torque target value $T_m$ to the rotation speed $\omega_m$, and is a transfer characteristic in which a damping coefficient (not shown) of the practical transfer characteristic Gp(s) is set to "1".

The feedback compensator 702 calculates a second torque target value $T_{m2}$ based on the rotation speed $\omega_m$.

The final torque command value calculation unit 703 calculates the final torque command value $T_{mf}$ by feeding back the second torque target value $T_{m2}$ outputted by the feedback compensator 702 to the first torque target value $T_{m1}$ outputted by the feedforward compensator 701. That is, the final torque command value calculation unit 703 calculates the final torque command value $T_{mf}$ by correcting the first torque target value $T_{m1}$ by the second torque target value $T_{m2}$. In the present embodiment, the final torque command value calculation unit 703 is, for example, a subtraction unit, and calculates the final torque command value $T_{mf}$ by subtracting the second torque target value $T_{m2}$ from the first torque target value $T_{m1}$. Note that the feedback of the second torque target value $T_{m2}$ with respect to the first torque target value $T_{m1}$ is synonymous with the feedback of the second torque target value $T_{m2}$ with respect to the driving torque target value $T_m$. Therefore, it can be said that the final torque command value calculation unit 703 feeds back the second torque target value $T_{m2}$ to the driving torque target value $T_m$.

The electric motor 4 is driven according to the final torque command value $T_{mf}$. When driving the electric motor 4 according to the final torque command value $T_{mf}$, a disturbance d may act. Note that in FIG. 7, the electric vehicle 100 is represented by a transfer characteristic Gp'(s).

The feedback compensator 702 is configured as follows. That is, the feedback compensator 702 includes a disturbance estimation filter 710, a first feedback compensation value calculation unit 711, a second feedback compensation value calculation unit 712, a third feedback compensation value calculation unit 713, a frequency setting unit 714, and a second torque target value calculation unit 715, and a gain setting unit 716.

The disturbance estimation filter 710 includes a rotation speed estimator 721, a subtracter 722, and a disturbance estimator 723.

The rotation speed estimator 721 calculates a rotation speed estimated value $\omega_m\hat{}$, which is an estimated value of the rotation speed $\omega_m$, based on the final torque command value $T_{mf}$. More specifically, the rotation speed estimator 721 is a filter for the transfer characteristic Gp(s), which is a vehicle model of the electric vehicle 100. That is, the rotation speed estimator 721 calculates the rotation speed estimated value $\omega_m\hat{}$ by filtering the final torque command value $T_{mf}$ using the transfer characteristic Gp(s).

The subtracter 722 calculates a deviation $\Delta\omega_m$ between an actual value of the rotation speed $\omega_m$ and the rotation speed estimated value $\omega_m\hat{}$. In the present embodiment, the subtracter 722 calculates the deviation $\Delta\omega_m$ by subtracting the actual value of the rotation speed $\omega_m$ from the rotation speed estimated value $\omega_m\hat{}$.

The disturbance estimator 723 calculates an estimated disturbance $d\hat{}$, which is an estimated value of the disturbance d acting on the electric vehicle 100, based on the deviation $\Delta\omega_m$. The disturbance estimator 723 includes, for example, a bandpass filter $H_2(s)$ and an inverse characteristic 1/Gp(s) of the transfer characteristic Gp(s), and is a filter having a characteristic represented by $H_2(s)/Gp(s)$. The bandpass filter $H_2(s)$ is set to transmit the frequency band of the torsional vibration of the wheel drive system and the frequency component of the inherent vibration of the electric vehicle 100 caused by the disturbance d. The bandpass filter $H_2(s)$ is set so that a difference between the denominator order and the numerator order is equal to or greater than a difference between the denominator order and the numerator order of the transfer characteristic Gp(s). Since the disturbance estimator 723 is configured using the bandpass filter $H_2(s)$ having the above characteristics, the feedback compensator 702 functions as a feedback element for suppressing the torsional vibration of the wheel drive system and the vibration caused by the disturbance d. Therefore, the estimated disturbance d^ calculated by the disturbance estimator 723 is a basic feedback compensation value (hereinafter sometimes referred to as a basic feedback compensation value) in the feedback compensator 702. Therefore, the disturbance estimator 723 functions as a basic feedback compensation value calculation unit.

Note that, for example, when the bandpass filter $H_2(s)$ is configured by a first-order high-pass filter and a first-order low-pass filter, the bandpass filter $H_2(s)$ can be expressed by the following equation (24). A time constant $T_H$ and a cutoff frequency $f_{HC}$ of the high-pass filter and a time constant $\tau_L$ and a cutoff frequency $f_{LC}$ of the low-pass filter used in the equation (24) are expressed by the following equations (25) to (28) using a resonance frequency $f_p$ of the torsional vibration of the wheel drive system and a predetermined coefficient k.

[Formula 9]

$$H_2(s) = \frac{\tau_H s}{(1+\tau_H s)(1+\tau_L s)} \quad (24)$$

$$\tau_L = \frac{1}{2\pi f_{HC}} \quad (25)$$

$$f_{HC} = k \cdot f_p \quad (26)$$

$$\tau_H = \frac{1}{2\pi f_{LC}} \quad (27)$$

$$f_{LC} = \frac{f_p}{k} \quad (28)$$

The first feedback compensation value calculation unit 711 calculates a feedback compensation value C1 based on the estimated disturbance d^ which is the basic feedback compensation value. The feedback compensation value C1 is a feedback compensation value for compensating for the torsional vibration of the wheel drive system. In the present embodiment, the first feedback compensation value calculation unit 711 calculates the feedback compensation value C1 by multiplying the estimated disturbance d^ by a gain $K_{fb1}$ using a multiplication unit 731. The gain $K_{fb1}$ is determined in advance by adaptation based on experiments, simulations, or the like.

The second feedback compensation value calculation unit 712 calculates a feedback compensation value C2 based on the estimated disturbance d^ which is the basic feedback compensation value. The feedback compensation value C2 is a feedback compensation value for compensating for vertical vibration caused by tire sinking or the like when traveling on a soft road surface such as sandy ground.

In the present embodiment, the second feedback compensation value calculation unit 712 is configured by a specific frequency component extractor 732 and a multiplication unit 733.

The specific frequency component extractor 732 is a filter that extracts a frequency component of vertical vibration occurring on a soft road surface such as sandy ground from the estimated disturbance d^. The specific frequency referred to here is a specific frequency or a specific frequency band extracted by the specific frequency component extractor 732. The specific frequency component is a specific frequency component extracted from the estimated disturbance d^ by the specific frequency component extractor 732. The specific frequency component extractor 732 is configured by, for example, a bandpass filter $H_3(s)$. Note that the frequency component of the vertical vibration that occurs on a soft road surface such as sandy ground is an inherent vibration frequency component of the electric vehicle 100, and is known through experiments, simulations, or the like. For this reason, the bandpass filter $H_3(s)$ is set to transmit at least the frequency component of the vertical vibration occurring on a soft road surface.

Figure 8:
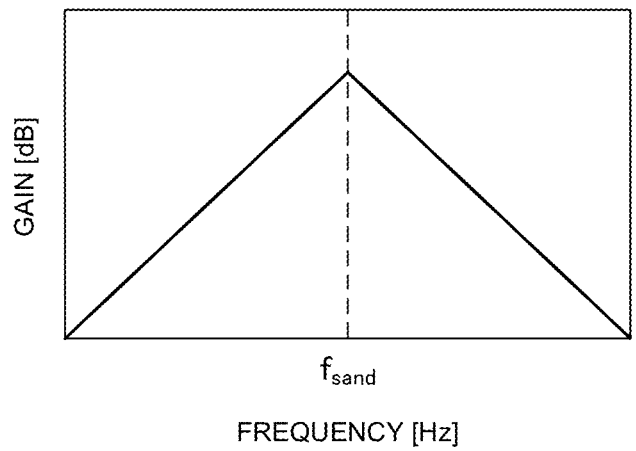
FIG. 8 is a graph showing characteristics of a bandpass filter $H_3(s)$.

FIG. 8 is a graph showing characteristics of the bandpass filter $H_3(s)$. A horizontal axis in FIG. 8 is a logarithmic scale. For example, the frequency (hereinafter referred to as sandy ground vertical vibration frequency) $f_{sand}$ of the vertical vibration that occurs when the electric vehicle 100 travels on sandy ground is determined depending on, for example, suspension characteristics of tires and vehicle body of the electric vehicle 100, and a sinking characteristic of the tires into the sandy ground. Therefore, the sandy ground vertical vibration frequency $f_{sand}$ is known through experiments, simulations, or the like. For this reason, the bandpass filter $H_3(s)$ is set, for example, as shown in the following equation (29) so as to transmit the component of the sandy ground vertical vibration frequency $f_{sand}$. A time constant $\tau_{sand}$ is expressed by the following equation (30).

[Formula 10]

$$H_3(s) = \frac{\tau_{sand} s}{(1+\tau_{sand} s)(1+\tau_{sand} s)} \quad (29)$$

$$\tau_{sand} = \frac{1}{2\pi f_{sand}} \quad (30)$$

In FIG. 8, the bandpass filter $H_3(s)$ is set to transmit the component of the sandy ground vertical vibration frequency $f_{sand}$ almost pinpoint. However, the present invention is not limited thereto, and the bandpass filter $H_3(s)$ may be set to transmit the sandy ground vertical vibration frequency $f_{sand}$ and frequencies in the vicinity thereof. That is, in FIG. 8, the bandpass filter $H_3(s)$ may be set so that a gain thereof becomes, for example, a trapezoidal graph with a center frequency being the sandy ground vertical vibration frequency $f_{sand}$.

The setting of the bandpass filter $H_3(s)$ when considering the vertical vibration occurring on a soft road surface other than sandy ground is also the same as when considering the vertical vibration occurring on sandy ground. When considering a plurality of types of soft road surface, the bandpass filter $H_3(s)$ can be set to transmit the frequency of the vertical vibration occurring on each type of soft road surface. The bandpass filter $H_3(s)$ may be set to transmit a frequency band including the frequency of vertical vibration occurring on each type of soft road surface.

The multiplication unit 733 (see FIG. 7) multiplies the specific frequency component extracted by the specific frequency component extractor 732 by a predetermined gain $K_{fb2}$. In this way, the feedback compensation value C2 is calculated. The gain $K_{fb2}$ is variable, and a value of the gain $K_{fb2}$ is adjusted by the gain setting unit 716.

The third feedback compensation value calculation unit 713 calculates a feedback compensation value C3 based on the estimated disturbance d^ which is the basic feedback compensation value. When on an uphill road, the feedback compensation value C3 is a feedback compensation value for compensating for the vibration that occur in the electric vehicle 100 due to torque ripple (cogging).

In the present embodiment, the third feedback compensation value calculation unit 713 is configured by a specific frequency component extractor 734 and a multiplication unit 735.

The specific frequency component extractor 734 is a filter that extracts the frequency component of the inherent vibration of the electric vehicle 100 that occurs in a traveling scene where a high torque is required, such as on an uphill road, from the estimated disturbance d^. The specific frequency referred to here is a specific frequency or a specific frequency band extracted by the specific frequency component extractor 734. The specific frequency component is a specific frequency component extracted from the estimated disturbance d^ by the specific frequency component extractor 734. The specific frequency component extractor 734 is configured by, for example, a bandpass filter $H_4(s)$. The bandpass filter $H_4(s)$ is set as follows.

Figure 9:
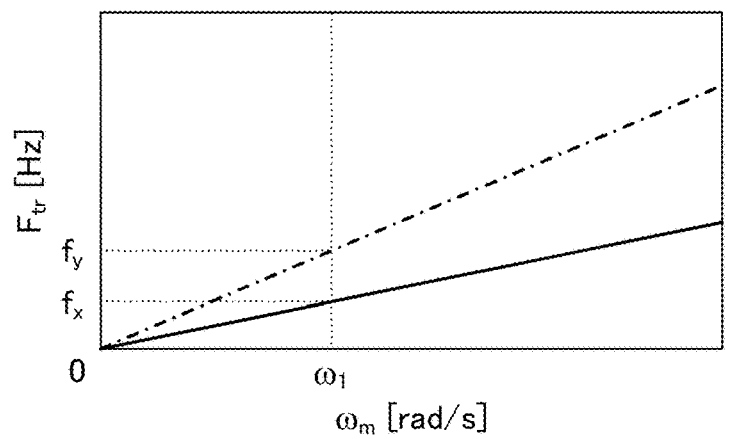
FIG. 9 is a graph showing a frequency of torque ripple that occurs when on an uphill road.

First, FIG. 9 is a graph showing the frequency of torque ripple (hereinafter referred to as torque ripple frequency) $F_{tr}$ that occurs when on an uphill road. As shown in FIG. 9, the torque ripple frequency $F_{tr}$ is proportional to the rotation speed $\omega_m$. The torque ripple frequency $F_{tr}$ differs depending on an order of the electric motor 4 relative to an electric angle. Here, the X-th order torque ripple of the electric angle is indicated by a solid line, and the Y-th order torque ripple of the electric angle (X<Y) is indicated by a dashed line. For example, when the rotation speed $\omega_m$ is a certain rotation speed $\omega_1$, an X-th torque ripple frequency is "$f_x$", and a Y-th torque ripple frequency is "$f_y$".

Figure 10:
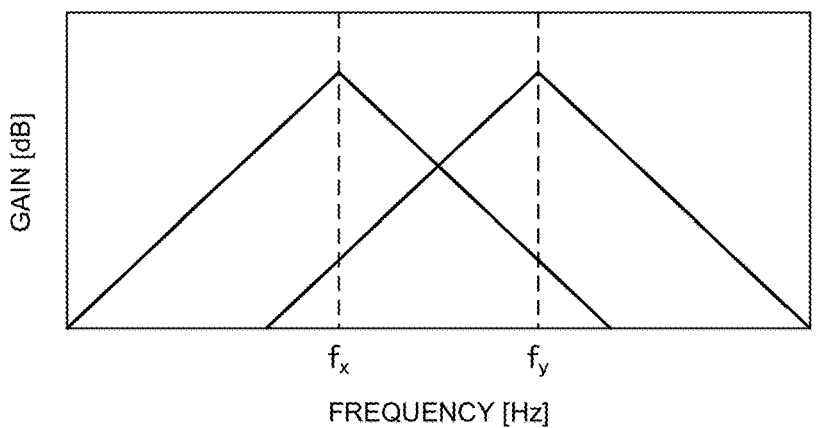
FIG. 10 is a graph showing characteristics of a $H_4(s)$ filter.

FIG. 10 is a graph showing characteristics of the bandpass filter $H_4(s)$. A horizontal axis in FIG. 10 is a logarithmic scale. For example, the torque ripple frequencies $f_x$ and $f_y$ of each order that occur when the electric vehicle 100 is on an uphill road are known through experiments, simulations, or the like. For this reason, the bandpass filter $H_4(s)$ is set, for example, as shown in the following equation (31), so as to transmit each component of the X-th torque ripple frequency $f_x$ and the Y-th torque ripple frequency $f_y$. The time constant $\tau_x$ related to the X-th torque ripple is expressed by the following equation (32), and the time constant $\tau_y$ related to the Y-th torque ripple is expressed by the following equation (33).

[Formula 11]

$$H_4(s) = \frac{\tau_X s}{(1+\tau_X s)(1+\tau_X s)} + \frac{\tau_Y s}{(1+\tau_Y s)(1+\tau_Y s)} \quad (31)$$

$$\tau_X = \frac{1}{2\pi f_X} \quad (32)$$

$$\tau_Y = \frac{1}{2\pi f_Y} \quad (33)$$

Furthermore, as mentioned above, since the torque ripple frequencies $f_x$, $f_y$ change depending on the rotation speed $\omega_m$, the torque ripple frequencies $f_x$, $f_y$ that determine the characteristics of the bandpass filter $H_4(s)$ are variable. That is, the characteristics of the bandpass filter $H_4(s)$ are adjusted as appropriate depending on the rotation speed $\omega_m$. The frequency setting unit 714 adjusts the bandpass filter $H_4(s)$.

The frequency setting unit 714 changes the torque ripple frequencies $f_x$ and $f_y$ that configure the bandpass filter $H_4(s)$ based on the rotation speed $\omega_m$. Specifically, the frequency setting unit 714 adjusts each of the torque ripple frequencies $f_x$, $f_y$ so that the larger the rotation speed $\omega_m$, the larger the torque ripple frequencies $f_x$, $f_y$. As a result, the time constants $\tau_x$ and $\tau_y$ are adjusted, and as a result, the characteristics of the bandpass filter $H_4(s)$ change according to the rotation speed $\omega_m$.

Note that in FIG. 10, the bandpass filter $H_4(s)$ is set to transmit the torque ripple frequency components of each order almost pinpoint. However, the present invention is not limited thereto, and the bandpass filter $H_4(s)$ may be set to transmit the torque ripple frequency of each order and frequencies in the vicinity thereof. That is, for example, in FIG. 10, the bandpass filter $H_4(s)$ may be set to have a combination of a trapezoidal graph whose center frequency is the X-th torque ripple frequency $f_x$ and a trapezoidal graph whose center frequency is the Y-th torque ripple frequency $f_y$.

Here, the bandpass filter $H_4(s)$ is schematically shown when considering the X-th torque ripple and the Y-th torque ripple, but the bandpass filter $H_4(s)$ can be configured considering only the X-th or Y-th torque ripple. The bandpass filter $H_4(s)$ may have a configuration that takes into consideration a torque ripple of orders other than the X-th and/or the Y-th order.

The multiplication unit 735 (see FIG. 7) multiplies the specific frequency component extracted by the specific frequency component extractor 734 by a predetermined gain $K_{fb3}$. In this way, the feedback compensation value C3 is calculated. The gain $K_{fb3}$ is variable, and a value of the gain $K_{fb3}$ is adjusted by the gain setting unit 716.

The second torque target value calculation unit 715 calculates the second torque target value $T_{m2}$ based on the feedback compensation values C1, C2, and C3. In the present embodiment, the second torque target value calculation unit 715 is configured by, for example, addition units 715a and 715b. The addition unit 715a adds the feedback compensation value C2 output by the second feedback compensation value calculation unit 712 and the feedback compensation value C3 output by the third feedback compensation value calculation unit 713. The addition unit 715b calculates the second torque target value $T_{m2}$ by further adding the feedback compensation value C1 output by the first feedback compensation value calculation unit 711 to the output of the addition unit 715a. That is, the second torque target value calculation unit 715 calculates the second torque target value $T_{m2}$ by adding up the feedback compensation values C1, C2, and C3.

The gain setting unit 716 adjusts the gain $K_{fb2}$ of the second feedback compensation value calculation unit 712 and the gain $K_{fb3}$ of the third feedback compensation value calculation unit 713, depending on the traveling load. That is, when traveling on a road surface with high traveling resistance, such as when traveling on a soft road surface such as sandy ground or an uphill road, or when traveling with a high torque is required, the gain setting unit 716 adjusts the gains $K_{fb2}$ and $K_{fb3}$ according to the traveling resistance. In the present embodiment, the gain setting unit 716 adjusts the gains $K_{fb2}$ and $K_{fb3}$ based on the disturbance torque estimated value $T_d^{\hat{}}$.

Figure 11:
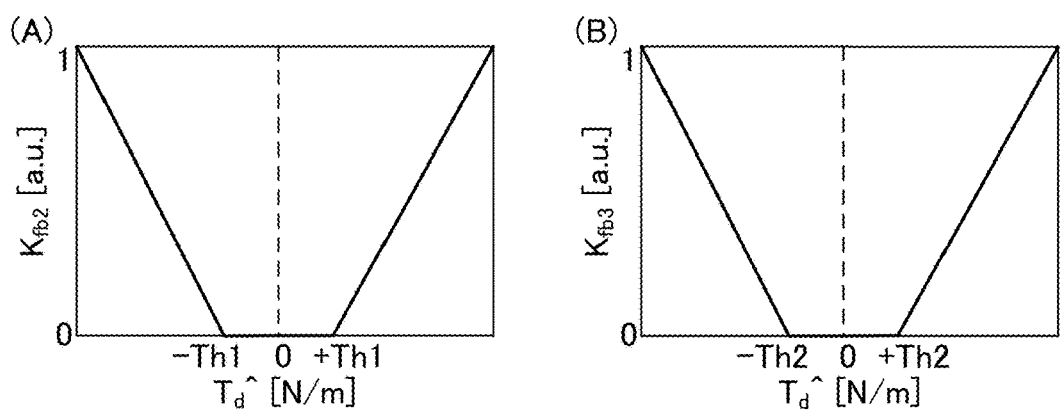
In FIG. 11 (A) is a graph showing an example of setting a gain $K_{fb2}$ and (B) is a graph showing an example of setting a gain $K_{fb3}$.

In FIG. 11, (A) is a graph showing an example of setting the gain $K_{fb2}$, and (B) is a graph showing an example of setting the gain $K_{fb3}$.

As shown in (A) of FIG. 11, the gain $K_{fb2}$ of the second feedback compensation value calculation unit 712 is set to increase in accordance with the disturbance torque estimated value $T_d^{\hat{}}$ when an absolute value of the disturbance torque estimated value $T_d^{\hat{}}$ is equal to or greater than a predetermined threshold Th1. That is, the gain setting unit 716 determines whether the vehicle is traveling on a soft road surface with large traveling resistance based on the disturbance torque estimated value $T_d^{\hat{}}$. When the disturbance torque estimated value $T_d^{\hat{}}$ is less than the threshold Th1, and the traveling resistance is small, and it is determined that the vehicle is not traveling on a soft road surface such as sandy ground, the gain setting unit 716 sets the gain $K_{fb2}$ of the second feedback compensation value calculation unit 712 to zero. As a result, when traveling on a hard road surface, the second feedback compensation value calculation unit 712 is substantially disabled, and overcompensation by the feedback compensation value C2 is prevented.

On the other hand, when the disturbance torque estimated value $T_d\hat{}$ is equal to or greater than the threshold value Th1 and it is determined that the vehicle is traveling on a soft road surface such as sandy ground with high traveling resistance, the gain setting unit 716 adjusts the gain $K_{fb2}$ so as to be proportional to the disturbance torque estimated value $T_d\hat{}$, for example. That is, the gain $K_{fb2}$ is set to increase as the torque output by the electric motor 4 increases. In this way, an appropriate feedback compensation value C2 is calculated according to the amount of sinking of the drive wheels 9a, 9b on the soft road surface (softness of the soft road surface).

As shown in (B) of FIG. 11, the gain $K_{fb3}$ of the third feedback compensation value calculation unit 713 is set to increase in accordance with the disturbance torque estimated value $T_d\hat{}$ when an absolute value of the disturbance torque estimated value $T_d\hat{}$ is equal to or greater than a predetermined threshold Th2. That is, the gain setting unit 716 determines whether the vehicle is traveling on an uphill road where traveling resistance is large and a high torque is required, based on the disturbance torque estimated value $T_d\hat{}$. When the disturbance torque estimated value $T_d\hat{}$ is less than the threshold Th2, and the traveling resistance is small, and it is determined that the vehicle is not traveling on an uphill road, the gain setting unit 716 sets the gain $K_{fb3}$ of the third feedback compensation value calculation unit 713 to zero. As a result, when traveling on a flat road or a downhill road, the third feedback compensation value calculation unit 713 is substantially disabled, and overcompensation by the feedback compensation value C3 is prevented.

On the other hand, when the disturbance torque estimated value $T_d\hat{}$ is equal to or greater than the threshold value Th2, and the traveling resistance is large, and it is determined that the vehicle is in a traveling scene where a high torque is required, the gain setting unit 716 adjusts the gain $K_{fb3}$ so as to be proportional to the disturbance torque estimated value $T_d\hat{}$, for example. That is, the gain $K_{fb3}$ is set to increase as the torque output by the electric motor 4 increases. In this way, an appropriate feedback compensation value C3 is calculated depending on the magnitude of the torque ripple.

The threshold Th2 for determining a soft road surface is, in principle, a different value from the threshold Th1 for determining an uphill road. However, depending on the actual vibration characteristics of the electric vehicle 100, the threshold Th2 may be the same value as the threshold Th1.

Note that in the present embodiment, as described above, the gain setting unit 716 determines a soft road surface and/or an uphill road based on the disturbance torque estimated value $T_d\hat{}$ obtained from the final torque command value $T_{mf}$ and the rotation speed $\omega_m$, and adjusts the gains $K_{fb2}$ and $K_{fb3}$. However, the present invention is not limited thereto, and for example, the gain setting unit 716 can perform similar determination and adjustment based on the driving torque target value $T_m$ or the final torque command value $T_{mf}$ instead of the disturbance torque estimated value $T_d\hat{}$.

However, when the above determination and adjustment are made based on the driving torque target value $T_m$ or the final torque command value $T_{mf}$, the determination and adjustment are simpler than when the above determination and adjustment are made based on the disturbance torque estimated value $T_d\hat{}$. This is because, determination based on the disturbance torque estimated value $T_d\hat{}$ is almost directly based on the traveling resistance, whereas the determination based on the driving torque target value $T_m$ or the final torque command value $T_{mf}$ is a determination of a traveling scene that requires at least a high torque.

Regardless of the magnitude of the torque output by the electric motor 4, if the value of the gain $K_{fb2}$ and/or the gain $K_{fb3}$ is set to a large value throughout the entire range, high frequency noise may occur. Therefore, as mentioned above, when the traveling resistance is large or a high torque is required, by setting the gain $K_{fb2}$ and/or the gain $K_{fb3}$ to a large value, vibration damping control particularly suitable for each traveling scene can be achieved while ensuring control stability.

As described above, in the electric vehicle 100 of the present embodiment, the feedback compensator 702, which is one of the elements that implement the vibration damping control processing, includes three systems of feedback compensation value calculation units: the first feedback compensation value calculation unit 711, the second feedback compensation value calculation unit 712, and the third feedback compensation value calculation unit 713.

The first feedback compensation value calculation unit 711 is the most basic main feedback element for suppressing torsional vibration of the wheel drive system, which can occur regardless of the traveling resistance or the like. In contrast, the second feedback compensation value calculation unit 712 and the third feedback compensation value calculation unit 713 are auxiliary feedback elements for suppressing additional vibration that occurs in specific traveling scenes where the traveling resistance is large, such as on a soft road surface such sandy ground or on an uphill road.

Therefore, the feedback compensation value C1 output by the first feedback compensation value calculation unit 711 can be said as a main feedback compensation value or a first feedback compensation value in relation to the feedback compensation values C2 and C3. The gain $K_{fb1}$ used in the first feedback compensation value calculation unit 711 can be said as a main feedback gain, a first feedback gain, or a first gain in relation to the gains $K_{fb2}$ and $K_{fb3}$.

The feedback compensation value C2 output by the second feedback compensation value calculation unit 712 and/or the feedback compensation value C3 output by the third feedback compensation value calculation unit 713 can be said as a sub feedback compensation value or a second feedback compensation value in relation to the feedback compensation value C1. The gain $K_{fb2}$ used in the second feedback compensation value calculation unit 712 and the gain $K_{fb3}$ used in the third feedback compensation value calculation unit 13 can be said as a sub feedback gain, a second feedback gain, or a second gain in relation to the gain $K_{fb1}$.

<Effects>

Hereinafter, effects related to the vibration damping control of the electric vehicle 100 configured as described above will be explained.

Figure 12:
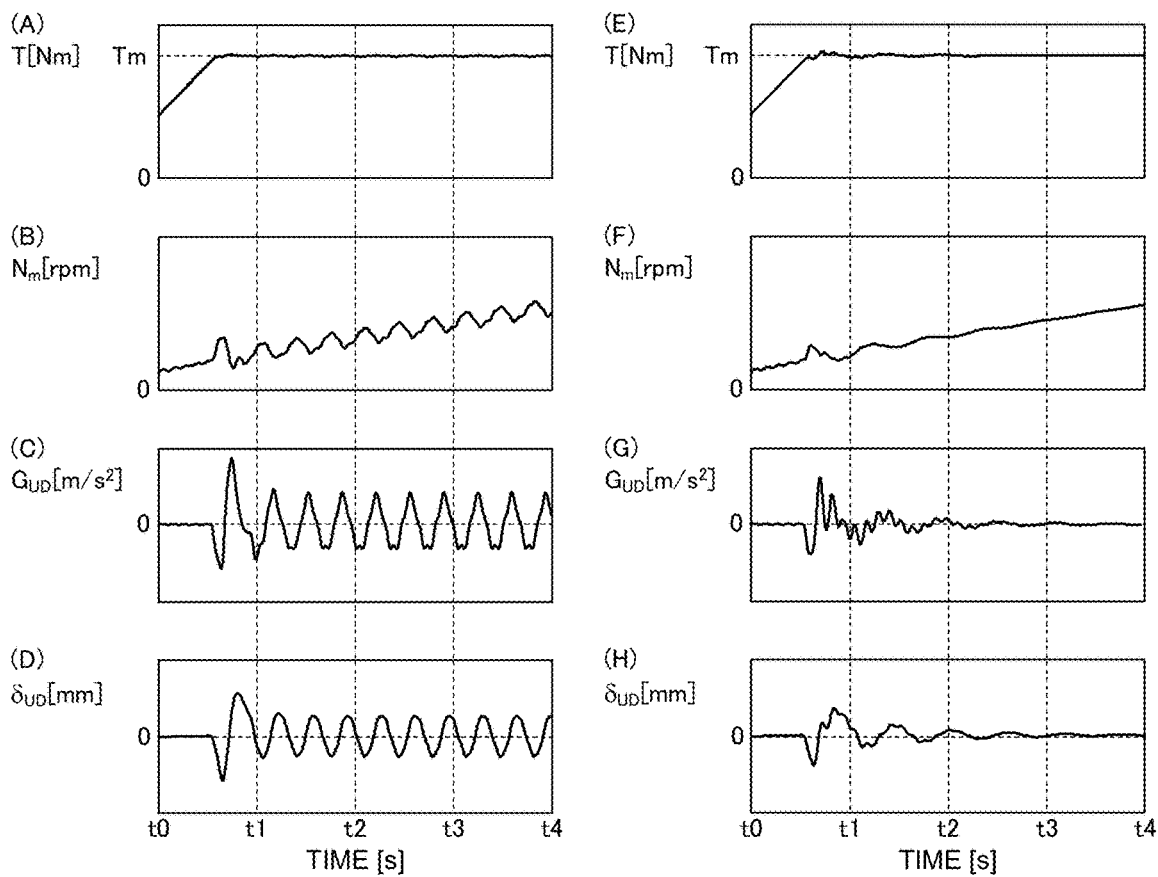
FIG. 12 is a time chart showing changes in torque, rotation speed, vertical acceleration, and vertical movement amount when vibration damping control of a comparative example and vibration damping control of an embodiment are implemented on sandy ground.

FIG. 12 is a time chart showing changes in the torque T, the rotation speed $N_m$, a vertical acceleration $G_{UD}$, and a vertical movement amount $\delta_{UD}$ when vibration damping control of a comparative example and the vibration damping control of the present embodiment are implemented on sandy ground. The vibration damping control in the comparative example here is vibration damping control in which the feedback compensator 702 includes only the first feedback compensation value calculation unit 711 and does not include the second feedback compensation value calculation unit 712 and the third feedback compensation value calculation unit 713.

In FIG. 12, (A) to (D) are time charts showing changes in the torque T, the rotation speed $N_m$, the vertical acceleration $G_{UD}$, and the vertical movement amount $\delta_{UD}$ when the vibration damping control of the comparative example is implemented on sandy ground. In FIG. 12, (E) to (H) are time charts showing changes in the torque T, the rotation speed $N_m$, the vertical acceleration $G_{UD}$, and the vertical movement amount $\delta_{UD}$ when the vibration damping control of the present embodiment is implemented on sandy ground. Note that due to the influence of the tires sinking into the sandy ground, the traveling resistance in a forward direction increases, and as a result, the disturbance torque estimated value $\hat{T_d}$ is always a positive value.

As shown in (A) of FIG. 12, from a time t0 when the electric vehicle 100 is stopped, a driver depresses an accelerator, and the driving torque target value $T_m$ is input according to a ramp function. In the vibration damping control of the comparative example, the feedback compensator 702 includes only the first feedback compensation value calculation unit 711 and does not include the second feedback compensation value calculation unit 712. Therefore, in the vibration damping control of the comparative example, as shown in (B) to (D) in FIG. 12, from a time t1 to a time t4 after the time to, the rotation speed $N_m$, the vertical acceleration $G_{UD}$, and the vertical movement amount $\delta_{UD}$ oscillate periodically and continuously. It indicates that vertical vibration occurs due to the drive wheels 9a, 9b sinking into the sandy ground road surface. That is, in the vibration damping control of the comparative example, as a result of only the feedback compensation value C1 being fed back as the second torque target value $T_{m2}$, although the torsional vibration of the wheel drive system is suppressed, the vertical vibration occurs due to sinking of the drive wheels 9a, 9b into the sandy ground road surface.

On the other hand, as shown in (E) of FIG. 12, in the electric vehicle 100 that implements the vibration damping control of the present embodiment, from the time t0 when the electric vehicle 100 is stopped, the driver depresses the accelerator, and the driving torque target value $T_m$ is input according to the ramp function. However, in the vibration damping control of the present embodiment, the feedback compensator 702 includes the second feedback compensation value calculation unit 712 in addition to the first feedback compensation value calculation unit 711. Therefore, in the vibration damping control of the present embodiment, as shown in (F) to (H) of FIG. 12, at the times t1 to t4 after the time to, the oscillation in the rotation speed $N_m$, the vertical acceleration $G_{UD}$, and the vertical movement amount $\delta_{UD}$ are suppressed more than when implementing the vibration damping control of the comparative example. That is, as a result of feeding back a sum of the feedback compensation value C1 and the feedback compensation value C2 as the second torque target value $T_{m2}$, in the vibration damping control of the present embodiment, not only the torsional vibration of the wheel drive system but also the vertical vibration caused by sinking of the drive wheels 9a, 9b into the sandy ground road surface is suppressed.

Especially, in the vibration damping control of the present embodiment, by adjusting the gain $K_{fb2}$ of the second feedback compensation value calculation unit 712 according to the disturbance torque estimated value $\hat{T_d}$, the vertical vibration is suppressed at a very early time about the time t1 to the time t2 from the time t0.

Figure 13:
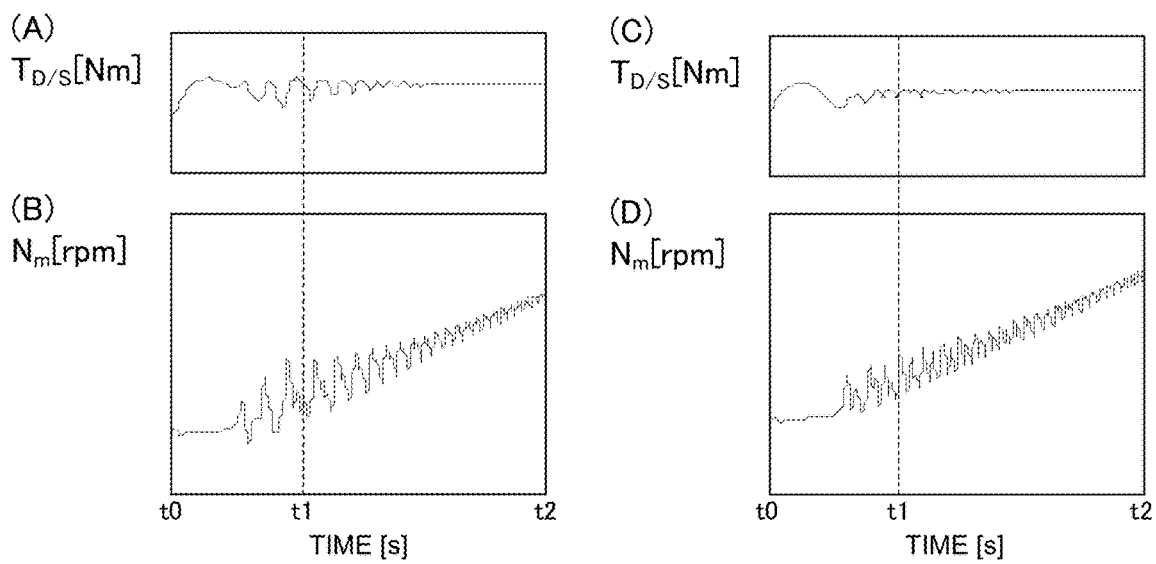
FIG. 13 is a time chart showing changes in drive shaft torque and rotation speed when the vibration damping control of the comparative example and the vibration damping control of the embodiment are implemented on an uphill road.

FIG. 13 is a time chart showing changes in a drive shaft torque $T_{D/S}$ and the rotation speed $N_m$ when the vibration damping control of the comparative example and the vibration damping control of the present embodiment are implemented on an uphill road. The vibration damping control in the comparative example here is vibration damping control in which the feedback compensator 702 includes only the first feedback compensation value calculation unit 711 and does not include the second feedback compensation value calculation unit 712 and the third feedback compensation value calculation unit 713.

In FIG. 13, (A) and (B) are time charts showing changes in the drive shaft torque $T_{D/S}$ and the rotation speed $N_m$ when the vibration damping control of the comparative example is implemented on an uphill road. In FIG. 13, (C) and (D) are time charts showing changes in the drive shaft torque $T_{D/S}$ and the rotation speed $N_m$ when the vibration damping control of the present embodiment is implemented on an uphill road. Note that on an uphill road, the traveling resistance in the forward direction increases, and as a result, the disturbance torque estimated value $\hat{T_d}$ is always a positive value. Here, from the time t0 when the electric vehicle 100 is stopped, the driver depresses the accelerator, and the driving torque target value $T_m$ is input according to the ramp function.

In the vibration damping control of the comparative example, the feedback compensator 702 does not include the third feedback compensation value calculation unit 713 for suppressing vibration related to the torque ripple occurring on an uphill road. Therefore, in addition to the torsional vibration of the wheel drive system, due to the occurrence of torque ripple caused by cogging, in the vibration damping control of the comparative example, as shown in (A) and (B) in FIG. 13, a relatively large oscillation occurs in the drive shaft torque $T_{D/S}$ and the rotation speed $N_m$. As a result, vibration caused by the torque ripple occurs in the vehicle body. That is, in the vibration damping control of the comparative example, as a result of only the feedback compensation value C1 being fed back as the second torque target value $T_{m2}$, although the torsional vibration in the wheel drive system is suppressed, vibration due to the torque ripple still occurs.

However, in the electric vehicle 100 that implements the vibration damping control of the present embodiment, the feedback compensator 702 includes the third feedback compensation value calculation unit 713 in addition to the first feedback compensation value calculation unit 711. Therefore, in the vibration damping control of the present embodiment, as shown in (C) and (D) in FIG. 13, the oscillation in the drive shaft torque $T_{D/S}$ and the rotation speed $N_m$ is suppressed more than when implementing the vibration damping control of the comparative example. That is, as a result of feeding back a sum of the feedback compensation value C1 and the feedback compensation value C3 as the second torque target value $T_{m2}$, in the vibration damping control of the present embodiment, not only the torsional vibration of the wheel drive system but also the vibration related to a torque ripple is suppressed. Therefore, according to the vibration damping control of the present embodiment, the electric vehicle 100 can start and accelerate smoothly on an uphill road.

Especially, in the vibration damping control of the present embodiment, the gain $K_{fb3}$ of the third feedback compensation value calculation unit 713 is adjusted according to the disturbance torque estimated value $\hat{Ta}$. In the vibration damping control of the present embodiment, the characteristics of the bandpass filter $H_4(s)$ constituting the third feedback compensation value calculation unit 713 are adjusted as appropriate according to the rotation speed $\omega_m$. Therefore, in the vibration damping control of the present embodiment, the vibration related to torque ripple is accurately suppressed from about the time t0 to the very early time t1.

<First Modification>

In the above embodiment, description is made using a two-wheel drive (2 WD) electric vehicle 100 in which one electric motor 4 is used to drive the pair of left and right drive wheels 9a, 9b, but the present invention is also suitable for a four-wheel drive (4 WD) electric vehicle 1200.

Figure 14:
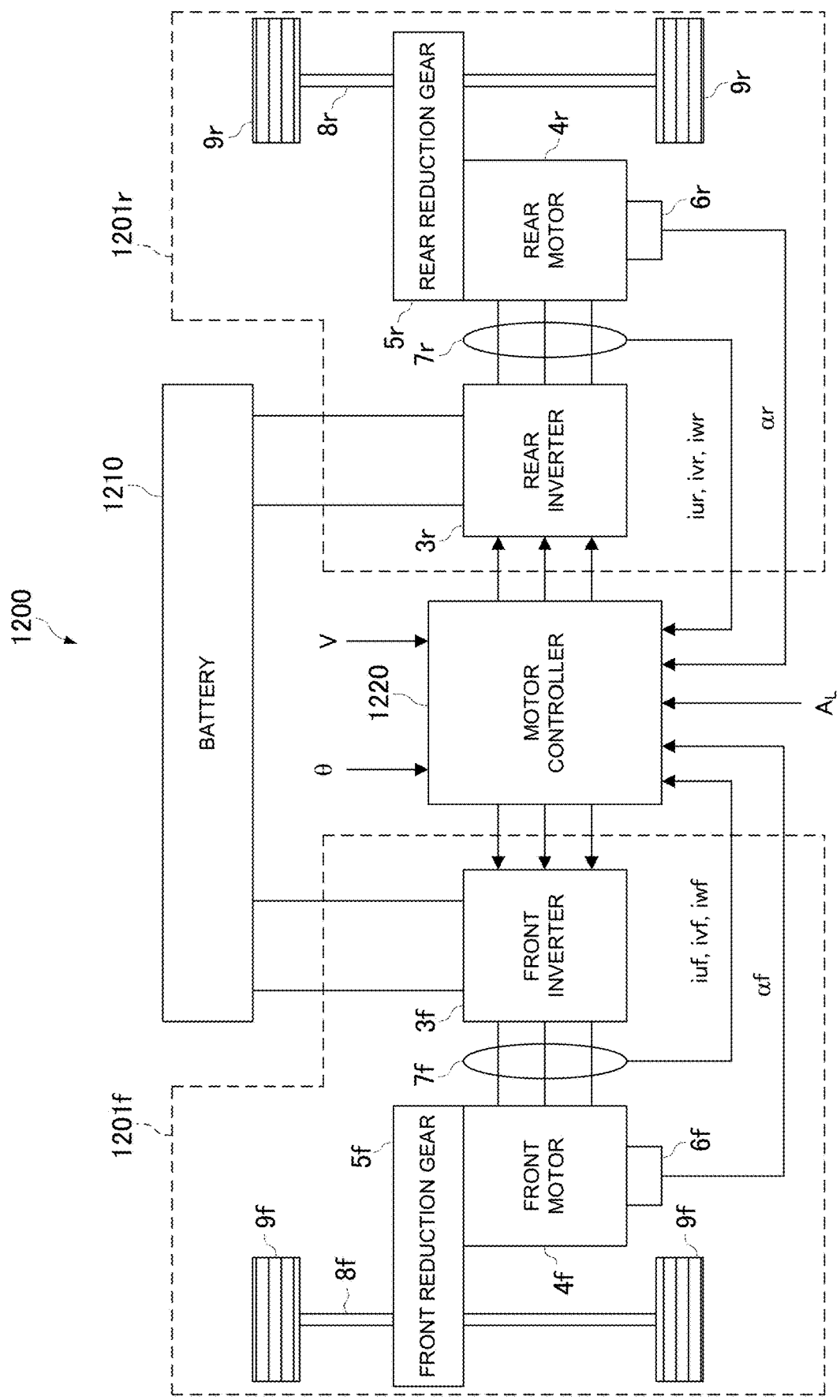
FIG. 14 is a block diagram showing a configuration of an electric vehicle according to a first modification.

FIG. 14 is a block diagram showing a configuration of the electric vehicle 1200 according to the first modification. As shown in FIG. 14, the 4 WD electric vehicle 1200 includes, for example, a front drive system 1201f, a rear drive system 1201r, and a battery 1210 and a motor controller 1220 that are common to the front drive system 1201f and the rear drive system 1201r.

The front drive system 1201f includes a front inverter 3f, a front drive motor 4f, a front reduction gear 5f, a front rotation sensor 6f, a front current sensor 7f, a front drive shaft 8f, and a pair of front drive wheels 9af, 9bf. The rear drive system 1201r includes a rear inverter 3r, a rear drive motor 4r, a rear reduction gear 5r, a rear rotation sensor 6r, a rear current sensor 7r, a rear drive shaft 8r, and a pair of rear drive wheels 9ar, 9br.

The front inverter 3f and the rear inverter 3r correspond to inverter 3 of the electric vehicle 100. The front drive motor 4f and the rear drive motor 4r correspond to the electric motor 4 of the electric vehicle 100. The front reduction gear 5f and the rear reduction gear 5r correspond to the reduction gear 5 of the electric vehicle 100. The front rotation sensor 6f and the rear rotation sensor 6r correspond to the rotation sensor 6 of the electric vehicle 100, and input a front rotor phase $\alpha f$ and a rear rotor phase $\alpha r$ to the motor controller 1220, respectively. The front current sensor 7f and the rear current sensor 7r correspond to the current sensor 7 of the electric vehicle 100, and input front currents $i_{uf}$, $i_{vf}$, $i_{wf}$ and rear currents $i_{ur}$, $i_{vr}$, $i_{wr}$ to the motor controller 1220, respectively. The front drive shaft 8f and the rear drive shaft 8r correspond to the drive shaft 8 of the electric vehicle 100. The front drive wheels 9af, 9bf and the rear drive wheels 9ar, 9br correspond to the drive wheels 9a, 9b of the electric vehicle 100.

The battery 1210 is one or more batteries corresponding to the battery 1 of the electric vehicle 100. The battery 1210 supplies electric power to the front drive motor 4f and the rear drive motor 4r via the front inverter 3f and the rear inverter 3r, respectively, or receives input of regenerative power.

The motor controller 1220 corresponds to the motor controller 2 of the electric vehicle 100, and similarly to the motor controller 2 of the electric vehicle 100, controls the front drive system 1201f and the rear drive system 1201r.

<Second Modification>

In the above embodiment and the like, as a result of setting the gains $K_{fb2}$ and $K_{fb3}$ according to the disturbance torque estimated value $T_d\hat{}$, there are scenes in which the second feedback compensation value calculation unit 712 and/or the third feedback compensation value calculation unit 713 become substantially disabled. However, in principle, the second feedback compensation value calculation unit 712 and the third feedback compensation value calculation unit 713 are always enabled. However, the present invention is not limited thereto, and the second feedback compensation value calculation unit 712 and the third feedback compensation value calculation unit 713 can be more explicitly enabled or disabled by setting by the driver of the electric vehicle 100, such as selection of a traveling mode.

Figure 15:
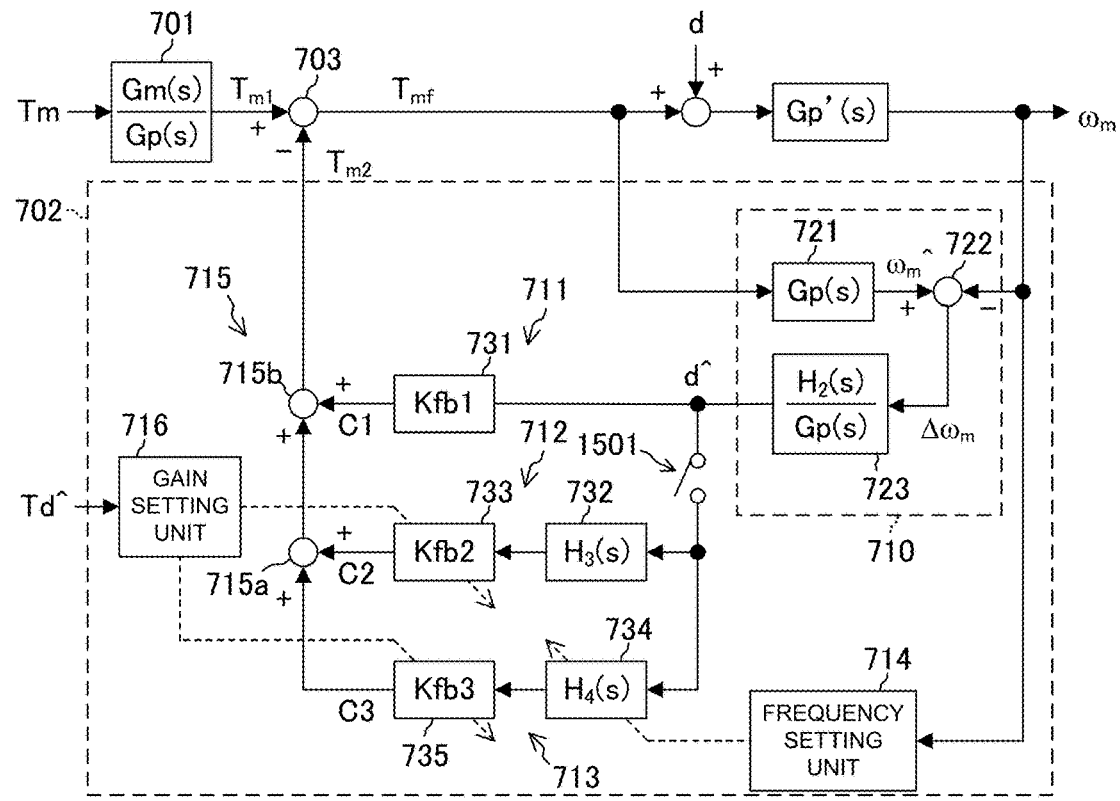
FIG. 15 is a block diagram of vibration damping control according to a second modification.

FIG. 15 is a block diagram of vibration damping control according to the second modification. In the vibration damping control shown in FIG. 15, a general switch 1501 is provided in a path through which the estimated disturbance $d\hat{}$ is input to the second feedback compensation value calculation unit 712 and the third feedback compensation value calculation unit 713. The other configurations are the same as those of the above embodiment. The switch 1501 is turned on/off by selecting a traveling mode of the electric vehicle 100, for example. Therefore, in the vibration damping control shown in FIG. 15, only when the additional vibration damping control is explicitly enabled by selecting the traveling mode, the compensation by the second feedback compensation value calculation unit 712 and the third feedback compensation value calculation unit 713 is enabled.

Figure 16:
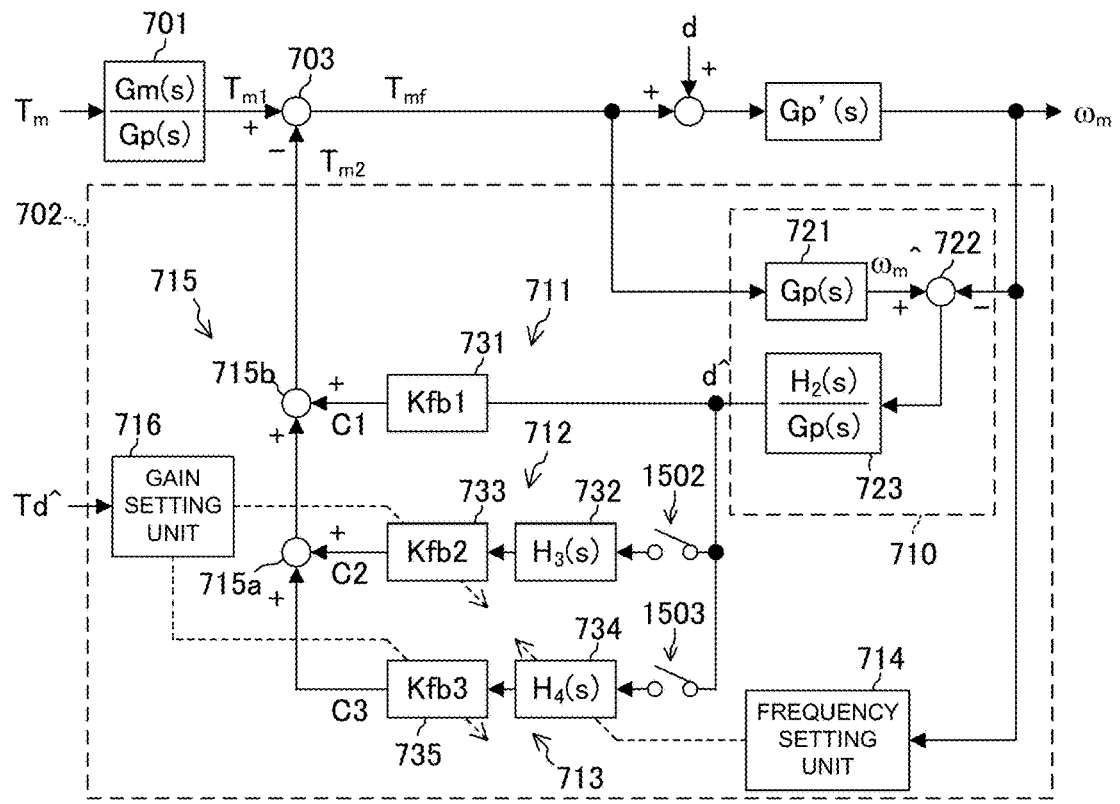
FIG. 16 is a block diagram of the vibration damping control according to the second modification.

FIG. 16 is a block diagram of the vibration damping control according to the second modification. In the vibration damping control shown in FIG. 16, switches 1502 and 1503 are separately provided in paths through which the estimated disturbance $d\hat{}$ is input to the second feedback compensation value calculation unit 712 and the third feedback compensation value calculation unit 713, respectively. The other configurations are the same as those of the above embodiment. The switches 1502 and 1503 are turned on/off by selecting a traveling mode of the electric vehicle 100, for example. Therefore, in the vibration damping control shown in FIG. 16, only when a compensation function for the vertical vibration that occurs on a soft road surface such as sandy ground is explicitly turned on by selecting a traveling mode, the second feedback compensation value calculation unit 712 is enabled. Only when a compensation function for vibration caused by torque ripple occurring on an uphill road is explicitly turned on by selecting a traveling mode, the third feedback compensation value calculation unit 713 is enabled.

As mentioned above, By explicitly turning on/off the second feedback compensation value calculation unit 712 and/or the third feedback compensation value calculation unit 713 by selecting a traveling mode or the like, a calculation load in scenes that do not require compensation by the above calculation units is reduced. Moreover, overcompensation is reliably prevented.

As described above, a method for controlling an electric vehicle according to the present embodiment is a method for controlling an electric vehicle 100 that includes the electric motor 4 as a driving source. In this method for controlling the electric vehicle, based on the vehicle information, a torque target value (driving torque target value $T_m$) which is a target value related to the driving torque of the electric vehicle 100 is set. A basic feedback compensation value (estimated disturbance $d\hat{}$) is calculated based on the parameter (rotation speed $\omega_m$) representing the rotation state of the electric motor 4 and the transfer characteristic $Gp(s)$ which is a vehicle model of the electric vehicle 100. The first feedback compensation value (feedback compensation value C1) is calculated by multiplying the basic feedback compensation value by the first gain ($K_{fb1}$). On the other hand, the second feedback compensation value (feedback compensation value C2 or C3) is calculated by extracting a predetermined specific frequency component from the basic feedback compensation value and multiplying the specific frequency component by the second gain ($K_{fb2}$ or $K_{fb3}$). By correcting the torque target value (driving torque target value $T_m$) using the first feedback compensation value (feedback compensation value C1) and the second feedback compensation value (feedback compensation value C2 and/or C3), the torque command value (final torque command value $T_{mf}$) is calculated. Then, the electric motor 4 is driven based on the torque command value calculated in this way.

Accordingly, in the method for controlling the electric vehicle according to the present embodiment and the like, the electric motor 4 is driven according to the torque target value corrected based not only on the first feedback compensation value for compensating for the torsional vibration of the wheel drive system but also on the second feedback compensation value for suppressing the vibration of the vehicle body due to other factors. Therefore, in addition to the vibration of the vehicle body caused by torsional vibration of the wheel drive system, vibration of the vehicle body due to factors other than the torsional vibration of the wheel drive system is also suppressed.

For example, when the traveling resistance of the road surface is high due to traveling on a soft road surface such as sandy ground, or when a high torque is required when traveling on an uphill road, not only the torsional vibration of the wheel drive system but also the vibration inherent to these traveling scenes are accurately eliminated or reduced. As a result, the electric vehicle 100 can start and/or accelerate smoothly even when traveling on a soft road surface such as sandy ground or on an uphill road.

In the method for controlling the electric vehicle according to the above embodiment and the like, the larger the torque output by the electric motor 4, the larger the second gain, which is the gain $K_{fb2}$ and/or the gain $K_{fb3}$, is adjusted. In this way, in a traveling scene where the electric motor 4 outputs a large torque, when the second gain, which is the gain $K_{fb2}$ and/or the gain $K_{fb3}$, is set to be large, on a soft road surface such as sandy ground or an uphill road, while achieving both traveling performance and stability, the torsional vibration in the wheel drive system and the vibration inherent to each traveling scene are suppressed.

In the method for controlling the electric vehicle according to the above embodiment and the like, the specific frequency component is an inherent vibration frequency component of the electric vehicle 100. In this way, by extracting the frequency component of the inherent vibration occurring in a specific traveling scene as a specific frequency component, the inherent vibration occurring on a soft road surface such as sandy ground, an uphill road, and the like can be accurately suppressed.

In the method for controlling the electric vehicle according to the above embodiment and the like, the specific frequency component includes at least a frequency component (sandy ground vertical vibration frequency $f_{sand}$) of vibration in an up-down direction that occurs in the electric vehicle 100 according to the suspension characteristics of the tires and the vehicle body of the electric vehicle 100, and the sinking characteristic of the tires on a soft road surface such as sandy ground. Therefore, in addition to the torsional vibration of the wheel drive system, at least the vertical vibration that occurs when traveling on a soft road surface such as sandy ground is accurately compensated. Especially, when traveling on sandy ground among the soft road surface, vertical vibration tends to appear prominently, so that the specific frequency component preferably includes at least the sandy ground vertical vibration frequency $f_{sand}$.

In the method for controlling the electric vehicle according to the above embodiment and the like, the specific frequency component includes at least the torque ripple frequency components $f_x$, $f_y$, and is changed according to the parameter (rotation speed $\omega_m$) representing the rotation state of the electric motor 4. As a result, in traveling scenes where traveling resistance is high and a high torque is required, such as an uphill road, vibration caused by torque ripple is accurately suppressed.

In the method for controlling the electric vehicle according to the above embodiment and the like, it is preferable that the specific frequency component includes a plurality of frequency components. When a plurality of frequency components are extracted as the specific frequency component, the vibration of each of these frequency components is accurately suppressed. Especially, the torque ripple that occurs in a traveling scene where traveling resistance is high and a high torque is required, such as on an uphill road, is a multi-order torque ripple such as X-th and Y-th order. Therefore, as described above, the specific frequency component includes a plurality of frequency components corresponding to the X-th, the Y-th and the like, so that the vibration caused by the torque ripple is particularly accurately suppressed.

In the above embodiment and the like, by comparing the absolute value of the torque command value such as the disturbance torque estimated value $T_d\hat{}$, the driving torque target value $T_m$, or the final torque command value $T_{mf}$ with the predetermined thresholds Th1 and Th2, a traveling scene in which the absolute value of the torque command value is equal to or greater than the threshold values Th1 and Th2 is determined. Then, when the absolute value of the torque command value is equal to or greater than the thresholds Th1, Th2, the feedback compensation values C2, C3, which are the second feedback compensation value, are calculated.

Inherent vibrations that appear in specific traveling scenes, such as on sandy ground or on an uphill road, tend to occur when a high torque is generally required. Therefore, as described above, if the feedback compensation values C2 and C3, which are the second feedback compensation value, are calculated in a traveling scene where a high torque is required, the inherent vibration that occurs only in a specific traveling scene can be easily and accurately suppressed.

In the above embodiment, especially based on the torque command value (final torque command value $T_{mf}$) and the parameter representing the rotation state of the electric motor 4 (rotation speed $\omega_m$), the disturbance torque estimated value $T_d\hat{}$, which is an estimated value of the disturbance torque acting on the electric vehicle 100, is calculated. By comparing the absolute value of the disturbance torque estimated value $T_d\hat{}$ with the predetermined thresholds Th1 and Th2, a traveling scene in which the absolute value of the disturbance torque estimated value $T_d\hat{}$ is equal to or greater than these threshold values Th1 and Th2 is determined. Then, when the absolute value of the disturbance torque estimated value $T_d\hat{}$ is equal to or greater than the thresholds Th1, Th2, the feedback compensation values C2, C3, which are the second feedback compensation value, are calculated.

In this way, when a traveling scene with high traveling resistance is determined based on the disturbance torque estimated value $T_{dA}$, and the feedback compensation values C2, C3, which are the second feedback compensation value, are calculated in the traveling scene with high traveling resistance, a specific traveling scene with high traveling resistance, such as sandy ground and an uphill road, can be determined particularly accurately. As a result, the inherent vibration that appears in a specific traveling scene such as on sandy ground or on an uphill road is suppressed particularly accurately.

Although the embodiment of the present invention has been described above, configurations described in the above embodiment and the modifications are only a part of application examples of the present invention, and are not intended to limit the technical scope of the present invention.

For example, in the above embodiment and the like, the rotation speed $\omega_m$ is used as a parameter representing the rotation state of the electric motor 4. However, instead of the rotation speed $\omega_m$, the parameter related to the rotation state of the electric motor 4, such as the rotation speed $N_m$, may be used for the vibration damping control or the like.

The invention claimed is:

1. A control method for an electric vehicle equipped with an electric motor as a driving source, the method comprising:
    setting a torque target value as a target value related to a driving torque of the electric vehicle based on vehicle information;
    calculating a basic feedback compensation value based on a parameter indicating a rotation state of the electric motor and a vehicle model of the electric vehicle;
    calculating a first feedback compensation value by multiplying the basic feedback compensation value by a first gain;
    calculating a second feedback compensation value by extracting a predetermined specific frequency component from the basic feedback compensation value and multiplying the specific frequency component by a second gain;
    calculating a torque command value by correcting the torque target value by the first feedback compensation value and the second feedback compensation value; and
    driving the electric motor based on the torque command value.

2. The control method for the electric vehicle according to claim 1, the method further comprising:
    adjusting the second gain to increase as a torque output by the electric motor increases.

3. The control method for the electric vehicle according to claim 1, wherein the specific frequency component is an inherent vibration frequency component of the electric vehicle.

4. The control method for the electric vehicle according to claim 3, wherein the specific frequency component includes at least a frequency component of vibration in an up-down direction that occurs in the electric vehicle according to suspension characteristics of a tire and a vehicle body of the electric vehicle and a sinking characteristic of the tire on a soft road surface.

5. The control method for the electric vehicle according to claim 3, wherein the specific frequency component includes at least a frequency component of torque ripple, and is changed according to the parameter.

6. The control method for the electric vehicle according to claim 3, wherein the specific frequency component includes a plurality of frequency components.

7. The control method for the electric vehicle according to claim 1, the method further comprising:
    determining a traveling scene in which an absolute value of the torque command value is equal to or greater than a predetermined threshold by comparing the absolute value of the torque command value with the threshold; and
    calculating the second feedback compensation value when the absolute value of the torque command value is equal to or greater than the threshold.

8. The control method for the electric vehicle according to claim 1, the method further comprising:
    calculating a disturbance torque estimated value as an estimated value of a disturbance torque acting on the electric vehicle, based on the torque command value and the parameter;
    determining a traveling scene in which an absolute value of the disturbance torque estimated value is equal to or greater than a predetermined threshold by comparing the absolute value of the disturbance torque estimated value with the threshold; and
    calculating the second feedback compensation value when the absolute value of the disturbance torque estimated value is equal to or greater than the threshold.

9. A control device for an electric vehicle that controls drive of the electric vehicle equipped with an electric motor as a driving source, the control device comprising:
    a torque target value setting unit that sets a torque target value as a target value related to a driving torque of the electric vehicle based on vehicle information;
    a basic feedback compensation value calculation unit that calculates a basic feedback compensation value based on a parameter indicating a rotation state of the electric motor and a vehicle model of the electric vehicle;
    a first feedback compensation value calculation unit that calculates a first feedback compensation value by multiplying the basic feedback compensation value by a first gain;
    a second feedback compensation value calculation unit that calculates a second feedback compensation value by extracting a predetermined specific frequency component from the basic feedback compensation value and multiplying the specific frequency component by a second gain;
    a torque command value calculation unit that calculates a torque command value by correcting the torque target value by the first feedback compensation value and the second feedback compensation value; and
    a drive control unit that drives the electric motor based on the torque command value.

* * * * *